United States Patent [19]
Wilson

[11] Patent Number: 5,611,642
[45] Date of Patent: Mar. 18, 1997

[54] REMEDIATION APPARATUS AND METHOD FOR ORGANIC CONTAMINATION IN SOIL AND GROUNDWATER

[76] Inventor: James T. Wilson, 61 Malibu Dr., Eatontown, N.J. 07724

[21] Appl. No.: 556,278

[22] Filed: Nov. 13, 1995

Related U.S. Application Data

[62] Division of Ser. No. 371,225, Jan. 11, 1995, Pat. No. 5,525,008.

[51] Int. Cl.$^6$ .............................. E02D 3/00; E21B 43/04
[52] U.S. Cl. ........................... 405/128; 405/263; 405/52; 166/278
[58] Field of Search ................................... 405/128, 269; 166/278, 276, 51; 588/218

[56] References Cited

U.S. PATENT DOCUMENTS

| | | | |
|---|---|---|---|
| 2,213,962 | 9/1940 | Layne | 166/278 |
| 2,677,428 | 5/1954 | Clark | 166/278 |
| 2,814,347 | 11/1957 | MacKnight | 166/278 |
| 4,867,238 | 9/1989 | Bayless et al. | 166/261 |
| 5,037,240 | 8/1991 | Sherman | 405/128 |
| 5,133,625 | 7/1992 | Albergo et al. | 405/263 |
| 5,251,700 | 10/1993 | Nelson et al. | 405/269 X |
| 5,269,943 | 12/1993 | Wickramanayake | 210/747 |

Primary Examiner—Stephen J. Novosad
Attorney, Agent, or Firm—Michaelson & Wallace; Peter L. Michaelson; Edward M. Fink

[57] ABSTRACT

The present invention provides a method and apparatus for in-situ treatment of soil and groundwater contaminated with organic pollutants. The process involves defining the nature and extent of the contamination; determining the hydrology and geology of the contaminated area; determining the volume and concentration of a reactive solution required to effect treatment of the contaminated area; injecting the reactive solution into one or more injectors that are inserted into the ground, sealed and positioned so as to assure flow of the reactive solution through the contaminated area; allowing the reactive solution to flow through the contaminated area thereby reacting chemically with the contaminants contained within the contaminated area; and determining when the treatment is complete by monitoring by-products of the chemical reaction. Preferably, the reactive solution is an aqueous solution of hydrogen peroxide and metallic salts.

2 Claims, 6 Drawing Sheets

REMEDIATION APPARATUS AND METHOD FOR ORGANIC CONTAMINATION IN SOIL AND GROUNDWATER

This application is a division of my patent application Ser. No. 08/371,225, filed on Jan. 11, 1995 now U.S. Pat. No. 5,525,008.

BACKGROUND OF THE INVENTION

1. Field of the Invention

The invention relates generally to the field of subterranean remediation and specifically to a method and apparatus for remediation of soil and groundwater which has become contaminated with organic materials.

2. Description of the Prior Art

Subterranean contamination, particularly the organic contamination of soil and groundwater which results from leaking storage facilities or accidental or even purposeful discharge, has become a problem in almost all industrialized areas of the planet.

Industrialized society has historically stored, discharged and disposed of various hazardous substances and waste products to the soil and groundwater over the years as a normal and acceptable form of disposal. In many instances, these discharges have occurred without any knowledge on the part of a facility owner or operator. Frequently, the discharge from tanks, lagoons, drum storage depots and other areas occur over a prolonged period of time. Oftentimes, the discharge results from a failure in the structural integrity of an underground storage tank and/or piping system. The discharged substances contaminate the soil and groundwater thereby causing severe damage to the local environment. As a consequence of these discharges and subsequent contamination, individuals, companies and governments are forced to expend a great deal of time and financial resources in remediation efforts.

The discharged substances are largely comprised of aromatic and aliphatic organic compounds refined from petroleum hydrocarbons. Frequently, these substances include halogenated organic substances and solvents which may also present a significant carcinogenic risk. These discharged substances have shown the ability to migrate to great depths beneath the surface of the soil and are, therefore, difficult to remediate by conventional methodologies. Examples of such substances discharged into the soil and groundwater include gasoline, fuel oil, motor oil, polychlorinated biphenyl (PCB), benzene, toluene, ethyl benzene and xylene. These latter four substances (Benzene, Toluene, Ethyl Benzene and Xylene) are the subject of BTEX (which is an Acronym for Benzene, Toluene, Ethyl Benzene and Xylene) testing. The BTEX measurement is often used as a quantitative determination of soil and groundwater contamination where a discharge of gasoline and/or fuel oil has occurred.

A number of remediation techniques have been used over the years and are shown in the prior art. Typical remediation techniques to remove contaminated soil from the environment include excavation of the contaminant and either: 1) depositing the excavated materials in a landfill as a temporary storage of the waste ("truck and haul" approach), or 2) transporting the excavated material to an incinerator and incinerating the excavated material. Some sites have been found to be so heavily contaminated that the construction of an incinerator on the site is justified. Regardless of where the incineration takes place, the incineration of contaminated materials can degrade air quality and further risk exposure of these contaminants to the environment at large. The "truck and haul" approach to soil remediation, generally consists of excavating the contaminated site and then hauling the contaminated soil away by truck to a landfill. The truck and haul approach is by far the most expensive method of soil remediation and is also the method least preferred by regulatory agencies. Placing contaminated soil in a landfill carries the additional risk of having to remediate the landfill at some future date, or perhaps exposing the owner of the landfill to additional liability should the landfill become subject to coverage under the Superfund Act.

Groundwater remediation consists mainly of "pump and treat" procedures whereby contaminated groundwater is pumped from underground to the surface where that groundwater is treated thereby remediating the contaminants. Remediated groundwater is then returned underground. Such a procedure is usually expensive and can require years to perform. Additionally, pump and treat groundwater remediation procedures may never fully return the groundwater to an acceptable condition to serve as a source of drinking water. Pump and treat groundwater remediation methods and their associated technologies are inherently inefficient; therefore, more advanced methodologies are required to reduce costs and more completely and safely effect treatment of groundwater.

More recently, however, the prior art has focused on providing in-situ remediative techniques, particularly employing bioremediation and in-situ oxidation using strong oxidizing agents, such as hydrogen peroxide.

Bioremediation technology has been of great interest in recent years; however, its effect on the treatment of contaminated soil and groundwater has been limited. For example, U.S. Pat. No. 4,749,491 (issued to Lawes et al on Jun. 7, 1988, hereinafter the Lawes '491 patent) teaches an in-situ process for the aerobic microbiological decomposition of chlorinated aliphatic hydrocarbons. Chlorinated aliphatic hydrocarbons such as 1,1,1- and 1,1,2-trichloroethane, 1,1- and 1,2-dichloroethane, trichloroethylene, chloroform, 1,1-dichloroethylene, cis- and trans-1,2-dichloroethylene, and vinyl chloride which have been reported as not being biodegradable under aerobic processes, can be eliminated through the process disclosed by the '491 Lawes patent by treatment of the contaminated water and soil with hydrogen peroxide and nutrients and indigenous microorganisms. In particular, hydrogen peroxide and nutrients in an aqueous solution are fed to the microbial flora. The aqueous solution containing hydrogen peroxide and nutrients is fed through one or more infiltration wells, flows through the subsurface contaminated area and is subsequently pumped from the ground through one or more extraction wells. The flow of the hydrogen peroxide and nutrients through the contaminated area causes indigenous microorganisms to grow consuming the contaminants.

A method for the in-situ remediation of a hydrocarbon-contaminated region of groundwater to destroy or reduce the concentration of hydrocarbon contaminants was shown in U.S. Pat. No. 5,268,141 (issued to Vigneri on Feb. 15, 1994 and referred to herein as the '141 Vigneri patent). This method utilizes a plurality of mutually spaced wells which are drilled into the Earth such that all of the wells intersect the groundwater region. The suitability of the contaminated region to treatment is determined by generating a test flow of hydrogen peroxide solution from one of the wells and monitoring pH changes at each of the other wells as a function of time. Subsequent to the suitability test, a treating flow of hydrogen peroxide solution is applied to one or more of the wells.

The chemistry utilized in the method disclosed in the '141 Vigneri patent dates back to 1898, when a method was developed which oxidized malic acid through the use of hydrogen peroxide and iron salts. This chemistry has been and is still widely used in the waste water industry for treatment of organic wastes (particularly non-biodegradable compounds). The process cleaves and oxidizes organic compounds into successively smaller chained hydrocarbon compounds. The intermediate compounds are mono- and di-carboxylic acids which are non-hazardous, naturally occurring substances that are easily oxidized to carbon dioxide and water during sequential reactions.

Although the chemistry used is well characterized and of known utility, the prior art method taught by the '141 Vigneri patent suffers from several serious infirmities. First, this prior art method does not actively disperse the hydrogen peroxide solution. Rather, this method depends instead upon normal diffusive characteristics of the aquifer. As a result, the hydrogen peroxide solution which is poured into the well has a tendency to remain in close physical proximity to the well and/or the well gravel surrounding the well. This minimizes the effective treatment radius, or oftentimes results in explosive concentrations of hydrogen peroxide being present near the well as the hydrogen peroxide degrades. A resulting explosion could quite literally send hydrogen peroxide, catalyst, groundwater, contaminants and soils shooting skyward and subsequently contaminating surface soils and water. Second, diffusive methods require a long time for the reagents used to diffuse throughout the aquifer thereby adding greatly to the time required to effect treatment of a contaminated area. Additionally, diffusive methods suffer from the fact that they do not actively promote the fracturing of the subsurface region, further limiting the effective treatment radius of the method.

Further limitations of diffusion only methods such as those taught by the '141 Vigneri patent include: the requirement for a relatively large number of wells because of the small effective treatment radius; and the extended time required to effect treatment due to the limitation of both the hydrogen peroxide concentrations used to 10–35% by weight and the flow rate of the treating solution to approximately 1–6 gallons per minute per well so as to reduce the possibility of explosions. Still further, while diffusive methods such as those taught by the '141 Vigneri patent have shown limited effectiveness in treating aquifers, there appears to be no evidence that such diffusive methods are of any value in remediating contaminant-laden subterranean soils.

Therefore, a continuing need exists in the art for a method, including accompanying apparatus, to remediate contaminated soil and groundwater more efficiently, reliably, economically and safely than has heretofore occurred with conventional methods.

SUMMARY OF THE INVENTION

My inventive method and accompanying apparatus for in-situ treating of soil and groundwater contaminated with pollutants advantageously overcomes the deficiencies in the art. Specifically, my inventive method includes the steps of: 1) defining a nature and extent of the contamination; 2) determining hydrology and geology of the contaminated area; 3) determining volume and concentration of a reactive solution required to effect treatment of the contaminated area; 4) injecting under pressure a reactive solution into one or more injectors that are inserted into the ground, sealed and positioned so as to assure flow of the reactive solution through the contaminated area and also cause a fracturing of the soils to permit enhanced dispersion of the reactive solution; 5) allowing the reactive solution to chemically react with the contaminants contained within the contaminated area; and 6) determining when the treatment is complete by monitoring by-products of the chemical reaction. Preferably, the reactive solution is an aqueous solution of hydrogen peroxide and metallic salts although those skilled in the art could readily utilize other oxidizers such as hypochlorite solutions.

Through use of the present invention, organic or other contaminants are converted into environmentally safe and non-toxic substances without producing any collateral contamination. My inventive method and apparatus effectively treats both soil and groundwater, regardless of whether the source of contamination is situated above or below ground level. Further, my invention does not disrupt the long-term, normal flow of ground water or surface water in or near the contaminated site and is applicable for both short and long-term treatment of a contaminated site.

BRIEF DESCRIPTION OF THE DRAWINGS

The teachings of the present invention can be readily understood by considering the following detailed description in conjunction with the accompanying drawings, in which.

To facilitate reader understanding, identical reference numerals are used to denote identical or similar elements that are common to the figures.

DETAILED DESCRIPTION

I will now describe a preferred embodiment of the invention while referring to the figures, several of which may be simultaneously referred to during the course of the following description.

Figure 1:
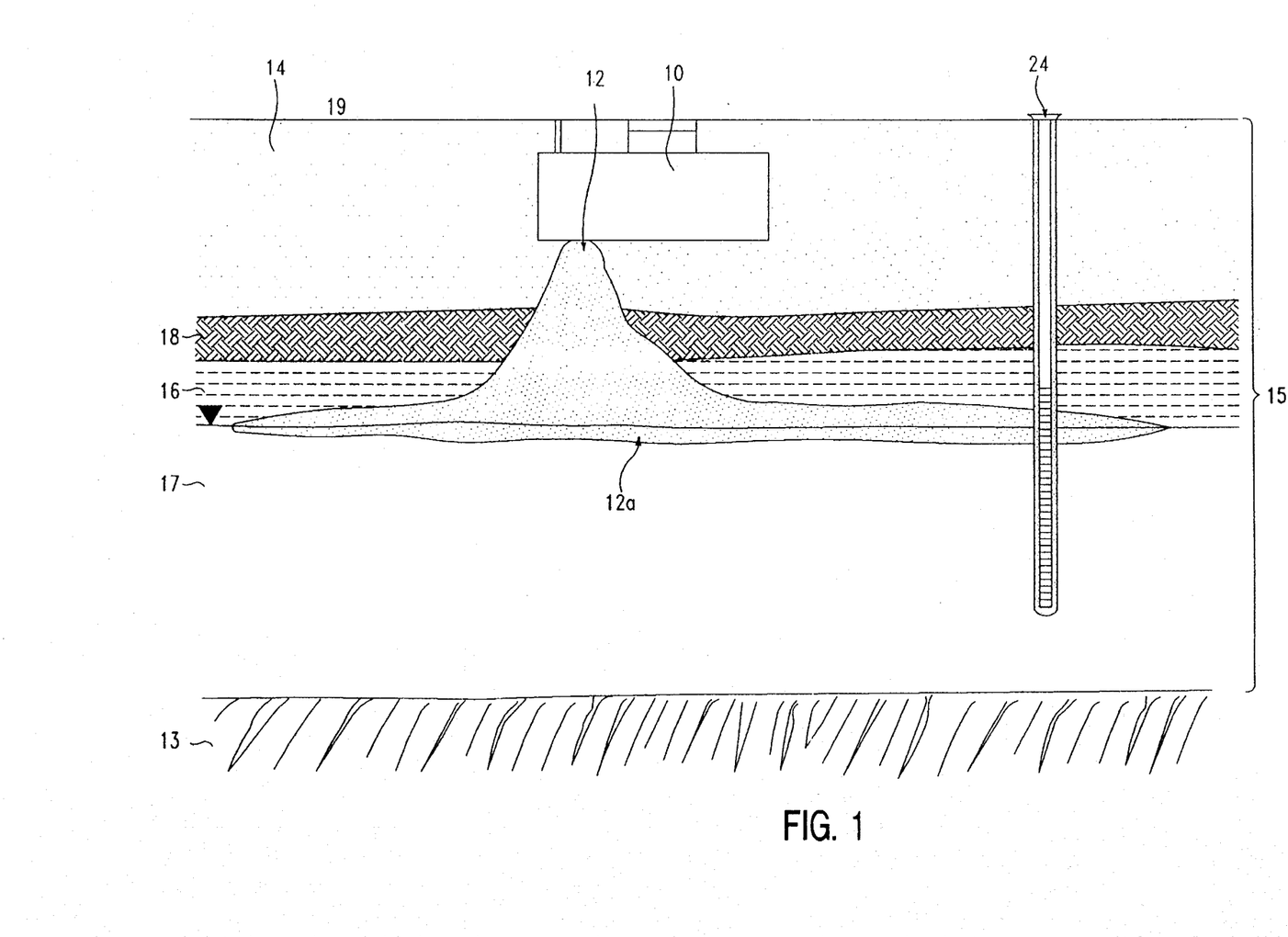
FIG. 1 illustrates a cross-sectional view of a representative remediation site where an underground storage tank (UST) has leaked an organic contaminant into the surrounding soils and groundwater and formed a large contaminant plume.

FIG. 1 is a representative cross-section of a typical remediation site. Underground storage tank 10, is shown leaking contaminant 12 into the surrounding soils and/or groundwater. The discharge impacts three separate areas beneath the ground-level surface 19. The discharge will contaminate soils 15; cause free floating or sinking contaminant on or beneath groundwater 17; and may partially dissolve contaminants into the groundwater. As shown in FIG. 1, the soils in which the contaminant comes in contact may be comprised of several different types of soils, i.e., sand 14, silt 16, or clay 18. These different soil structures define the strata of a given region. Frequently, and as shown in FIG. 1, these different types of soils occur at different depths from the ground-level surface 19. Additionally, representative remediation sites may include one or more underground strata, formed by natural causes which acts as a natural barrier to the unconfined migration of contaminant 12. While such strata may be impervious to contaminant 12 migration if the strata remains intact, fissures or cracks 13 which naturally occur in the strata may provide a conduit through which the contaminant plume may extend 12a.

The first step in my inventive remedial technique and apparatus involves characterizing the discharged substance(s). Substances which have been discharged to the soil and groundwater are chemically characterized by a variety of analytical methods, all of which are known in the art. Commonly used chemical characterization of contaminant 12 may include conventional BTEX testing, which provides a quantitative determination of Benzene, Toluene, Ethyl Benzene and Xylene.

Referring now to FIG. 1, monitoring well 24, is bored beneath ground-level surface 19 for the purpose of extracting a sample of groundwater 17 in an attempt to chemically characterize contaminant 12. Samples of soil 15 and/or groundwater 17 are taken from a number of locations throughout contaminated area 12a from which the nature of the discharged substance is determined by an appropriate analytical method i.e., Volatile Organic Analysis (VOA), BTEX. In those instances where the location of underground storage tank (UST) 10 that acts as the source of the contaminant plume 12a is known beforehand, a contaminant sample may be made directly from UST 10, if that source UST still contains a sufficient volume of the contaminant.

Figure 2:
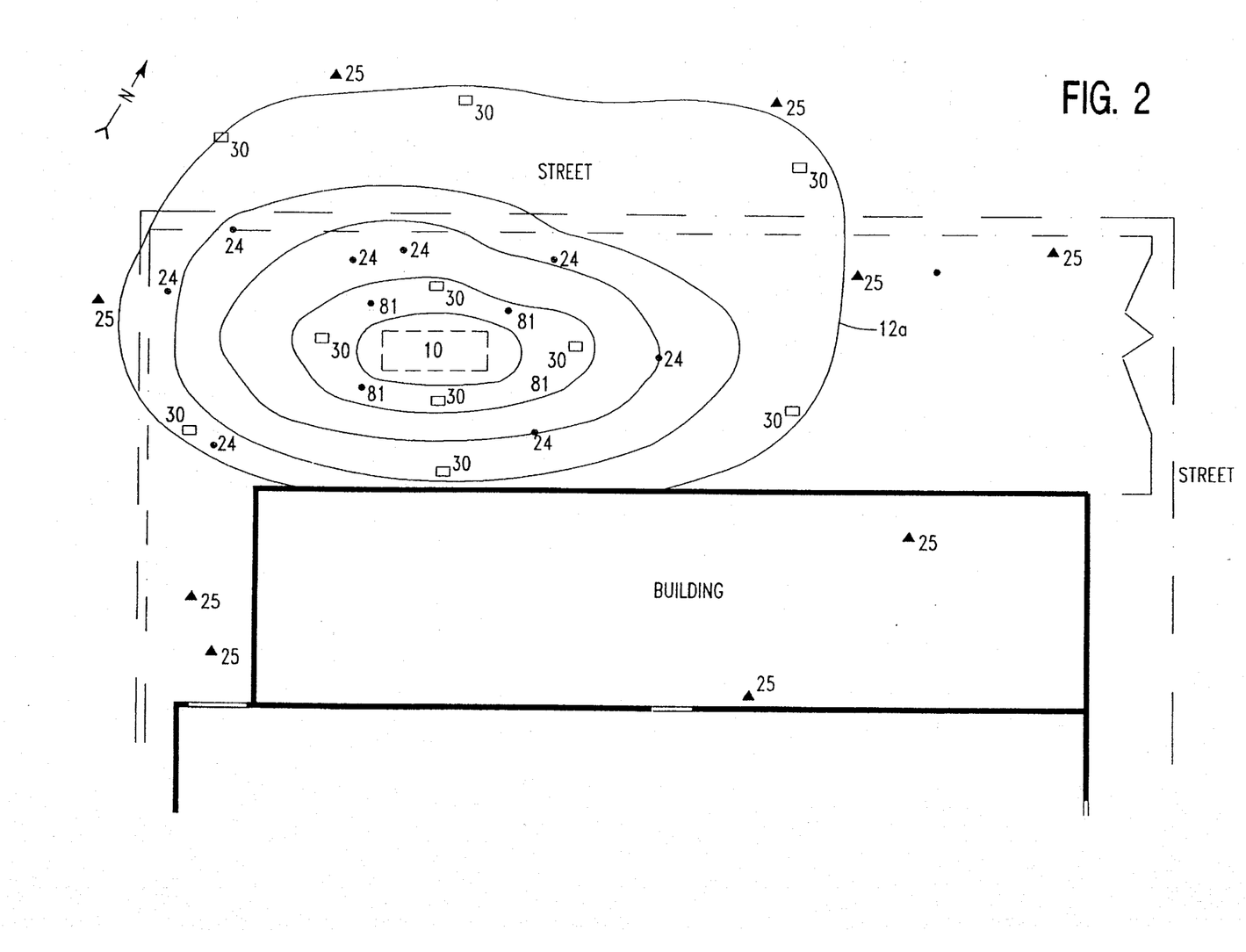
FIG. 2 illustrates a simplified, overhead plan view of the remediation site shown in FIG. 1, where a UST has leaked an organic contaminant into the surrounding soils and the extent of the resulting contaminant plume migration is shown relative to the depth from the surface.

Once the contaminants have been defined, a three-dimensional study is conducted to determine the volumetric quantities of the impacted area. FIG. 2 shows a leaky UST 10. At such a site, contaminant plume 12a consisting of the materials initially contained within leaky UST 10 and emanating therefrom. The shape and size of plume 12a is determined by a number of factors, e.g., the size of UST 10 and the volume of contaminant that it contained at the time the leak arose; the nature of the contaminant, i.e., heavy, viscous substances such as hydrocarbon based lubricants; and the geological characteristics of the soils and water surrounding UST 10, i.e., loose, permeable or tightly-packed soils or fast-moving or stagnant aquifer.

Contaminant plume 12a is delineated by boring a number of sentinel wells 25 in an area just outside the contaminant plume 12a and then subsequently performing an analytical characterization of samples taken from these wells. By inspection of FIG. 2, it can be seen that sentinel wells 25 lie outside of contaminant plume 12a while monitoring wells 24 lie within plume 12a. Samples taken from monitoring and sentinel wells 24 and 25, respectively, will therefore differ in composition and/or concentration as determined through subsequent analytical testing. After boring a number of such wells 24 and 25 and performing an analytical characterization of samples taken from these wells, a clear delineation of the contaminant plume is determined.

The delineation of contaminant plume 12a is not limited to just two dimensions as one may perceive from casual inspection of FIG. 2. That is, a determination of the volume of contaminant plume 12a is made by analyzing samples from wells 24 and 25 where the samples are analytically characterized according to the sample depth in the particular well. The data so produced from this analysis not only characterize the distance that the contaminant plume 12a has migrated, but also at what depth from the surface (denoted in FIG. 1 through reference numeral 19) that migration has taken place. Such a characterization is well known in the art as vertical delineation. FIG. 2 also shows the locations of the injectors 30 necessary to remediate the contaminant plume 12a.

Figure 3:
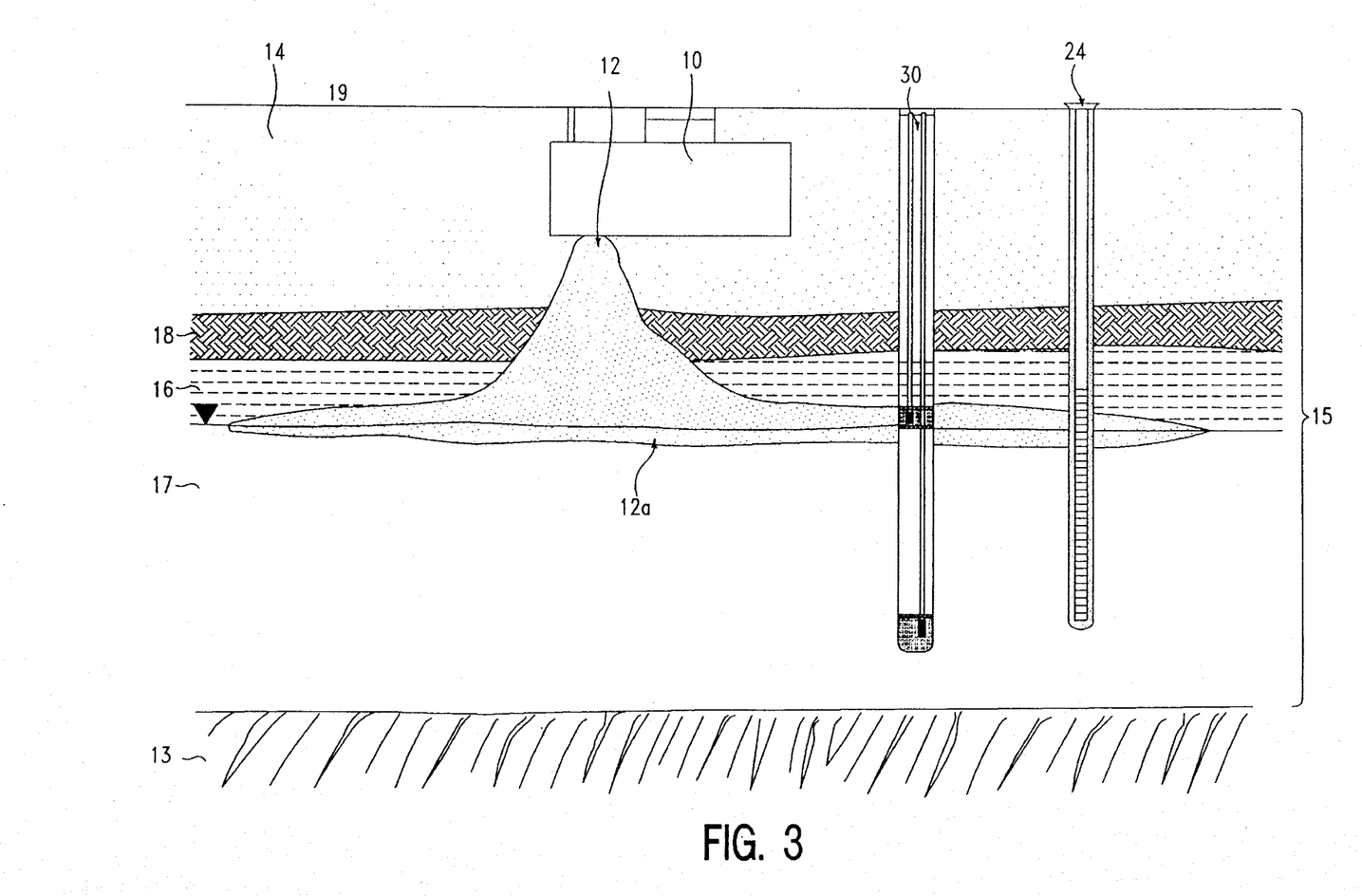
FIG. 3 is a cross sectional view of a typical remediation site showing a leaking UST, the resultant contaminant plume, an injector assembly, and the general characteristics of the soils at such a site.

Hydrogeological characterization of the contaminated region includes: composition of the soil (i.e., sand, silt, clay, etc.); soil porosity; soil permeability; hydraulic conductivity; mineral content; alkalinity; pH; salinity; and the profile of geological strata in the contaminated region. FIG. 3 is a cross-sectional view of a typical contaminated region. The physical hydrogeological characteristics of the contaminated region (porosity, permeability, conductivity, strata), which describe the subsurface waters and related geologic aspects of surface waters, are determinative of the number and placement of injectors 30 which intersect the contaminated region. The chemical characteristics of the contaminated region, organic contaminant concentration and characteristics (mineral content, alkalinity, pH, salinity) are determinative of the concentration and composition of the reactive solution which will subsequently be injected into the contaminated area via injectors 30.

Additional hydrogeological characterization may involve a determination of groundwater yield and formation pressure or total stress. The concept of yield is well known in the art and may be applied on several scales, that is, if the unit of study is a single well, then a well yield may be defined. If the unit of study is an aquifer, then an aquifer yield may be defined. As determined for the purposes of the present invention, a sustainable yield is the maximum pumping rate that can be supplied by a unit of study without lowering the groundwater level below a pump intake. The formation pressure or total stress of an area of soil is a function of the unit weight of the soil at a given depth. Such characterizations are all well known in the art.

Utilizing the volumetric quantities of contaminated area and the composition and concentration(s) of the contaminants, an absolute quantity of material is determined. A stoichometric equation is balanced and the theoretical quantity of hydrogen peroxide is determined for effective oxidative treatment of the contaminant. The utilized mass, area, volume, concentration calculations required for this step are generally well known by those skilled in the art.

Figure 4:
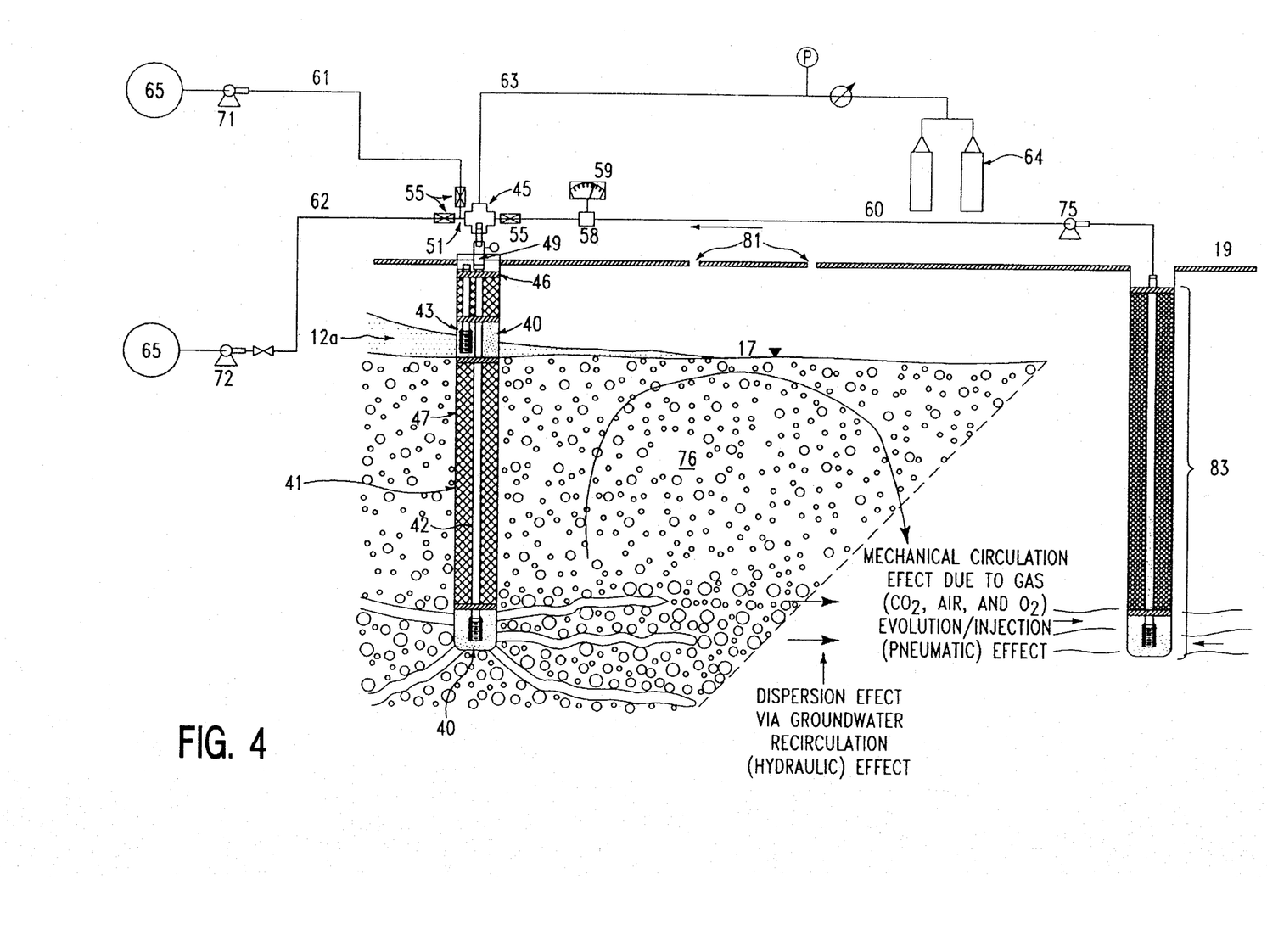
FIG. 4 is a detailed, cross-sectional view of an injector according to the present invention for treating a remediation site.

As shown pictorially in FIG. 4, injector 30 consists of a number of elements, most of which are advantageously constructed or assembled at the remediation site. Borehole 41 extends downwardly from ground-level surface 19 of the surrounding earth. At various levels in the earth below the surface 19, breaks in strata, voids, or changes in earth structure are commonly encountered and provide a conduit for contaminant migration. Elongated steel casing 42 is placed within and extends downwardly along the center of borehole 41. At the bottom-most portion of steel casing 42, enclosed, screen assembly 43, typically comprised of 2" (approximately 5 cm) screen is attached to the steel casing 42, by any one of a number of methods known in the art, e.g., threaded coupling. Screen assembly 43 is affixed to the steel casing 42, prior to inserting the steel casing into the borehole. Surrounding screen assembly 43 and filling a resulting void between the screen assembly 43 and the bottom of the borehole 41, is a gravel packing 40, generally comprised of "well gravel" which is well known in the art. Screen assembly 43 prevents gravel packing 40 from occluding steel casing 42 at the bottom of the borehole 41 thereby permitting dispersion of reagents throughout the underground region. While 2" screen works adequately for the screen assembly 43, those skilled in the art could use any of a number of different perforated or screened materials in lieu of the screen assembly.

It is necessary to establish a liquid-tight seal around the exterior surface of steel casing 42 within the surrounding, larger diameter borehole 41 in order to prevent materials from flowing in and filling borehole 41 around the steel casing. Also, since the inventive remediative method operates under, and produces additional subterranean temperatures and pressures, liquids may flow upwardly from lower levels in the borehole 41 and overflow onto the surface of the earth. The reagents injected into the subsurface and pressures generated within are specifically designed to fracture the formation and thus permit a greater infiltration of reagents necessary to oxidize the contaminants 12.

Therefore, and in accordance with the present invention, sealing layer 46 formed of water-swellable bentonite material is positioned within the borehole 41 such that the bentonite material contacts the walls of borehole 41 and surrounds steel casing 42. The bentonite material swells and completely fills the void between steel casing 42 and borehole 41 when the bentonite material contacts water thereby forming a seal. In this manner, the portion of the injector assembly which is located below the bentonite seal 46 is completely and effectively sealed from the upper portion of the borehole 41.

Additional sealing is provided by grout packing 47. The grout packing, which is comprised of Portland cement and well known in the art, is hydrated with water and the resultant aqueous mixture is poured into borehole 41 so that it completely fills the void between borehole 41 and steel casing 42 along the entire length of the borehole 41 from the bentonite seal 46 to the upper surface of the earth 19. The hydrated grout subsequently cures, and thereby forms a solid, impervious seal.

Figure 5:
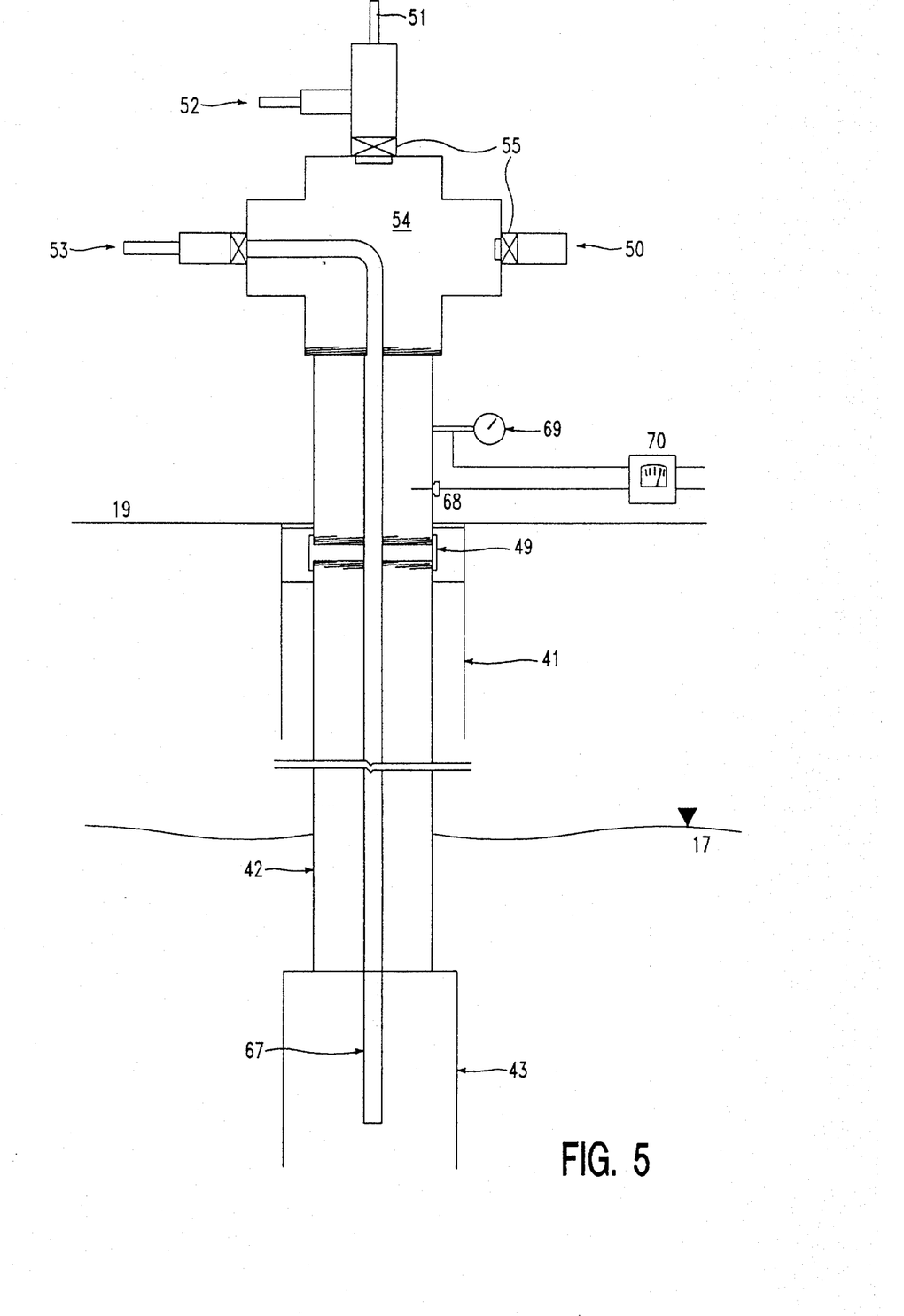
FIG. 5 is a cross-sectional view of an injector mixing head assembly according to the present invention which is affixed to the top of the injector shown in FIG. 4.

Injector mixing head assembly 45 is affixed to the topmost portion of steel casing 41 by any one of a number of methods known in the art, e.g., threaded coupling 49. Referring now to FIG. 5, mixing head 45 is hollow bodied, having a mixing chamber 54, a number of injector ports 50, 51, 52, and 53. For simplicity, ports 50, 51 and 52 are shown in communication with mixing chamber 54 and port 53 is shown in communication with steel casing outlet 42 although other combinations are possible. Mixing head 45 and all the injector ports 50, 51, 52 and 53 are preferably composed of steel or aluminum so as to be capable of withstanding the elevated temperatures and pressures generated during practice of my inventive method. Although the mixing head consists of four injector ports, 50, 51, 52, and 53 those skilled in the art could easily fabricate mixing heads comparable to mixing head 45, with a different number of injector ports or multiple outlets. Also shown are check valves 55 which are fixed within injector ports 50, 51, and 53 and which are also well known to those skilled in the art. Check valves 55 prevent any pressures generated within the mixing head or overall injector assembly from "backing-up" through any of the injector ports 50–53. Such pressures are instead directed continually through steel casing 42 toward screen assembly 43, thereby maintaining any underground pressures which more effectively disperses the reactive solution being injected and facilitates fracturing of the underground area. Pressure sensor 69 and temperature sensor 68 provides pressure and temperature data, respectively, to control unit 70 before, during and after remedial treatment.

Figure 6:
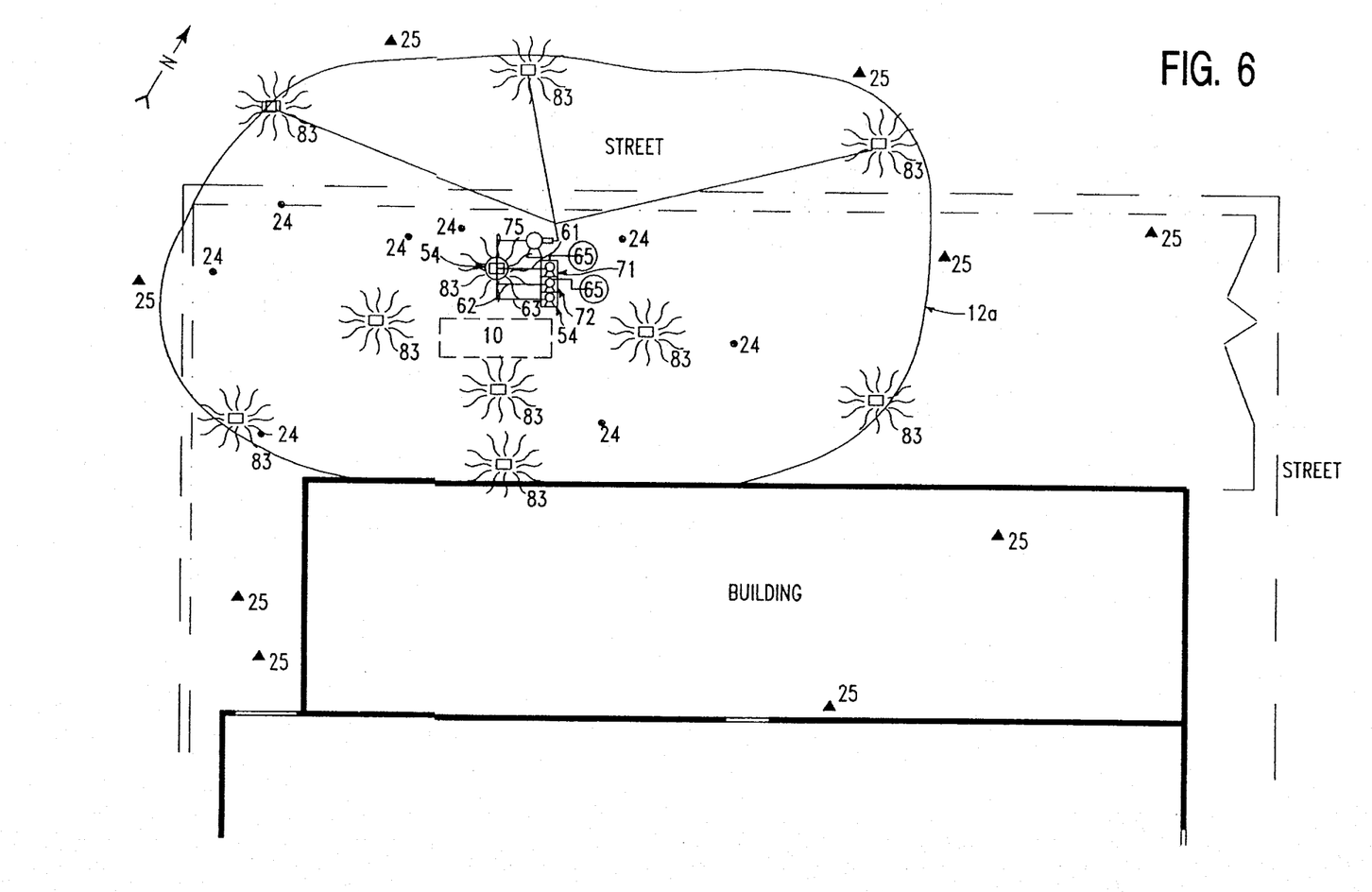
FIG. 6 is a overhead view of an illustrative remediation site showing all the components necessary to effect treatment of both soil and groundwater contamination in accordance with my present invention.

Referring now to FIG. 4 which shows a cross-sectional view of an entire remediation site, contaminant plume 12a is intersected by injector assembly 30 which has been constructed in the manner previously described herein. Quick-connect nipples and couplings attached to the injector mixing head facilitate field assembly of injector mixing head assembly 45 and injector ports 50–53 to supply lines 60, 61, 62 and 63 which carry the treating materials, i.e., recirculated groundwater, hydrogen peroxide solution, catalyst solution, air or other gases. Storage tanks 65 and 66 contain the hydrogen peroxide solution and catalyst solutions, respectively. Sparge pumps 64 provide treatment air to facilitate remediation. Pumps 71 and 72 provide the peroxide and catalyst solutions under pressure to mixing head assembly 45, by way of piping 61 and 62. The pressures produced by the pumps and used for the injection are variable, typically in the range of 5 Pounds/Square Inch (PSI) (0.35 Kg./sq.cm) up to the capacity of the particular pump used—which as those skilled in the art can appreciate can greatly exceed the formation pressure of the particular soils contained in the contaminated area. The pH, conductivity and dissolved oxygen probe 58 and meter 59 determine the need for additional amendments of hydrogen peroxide and catalyst solution during the course of the injection program. The pH is generally maintained within a range of 4–6 during the reaction thereby maintaining the optimal free-radical production. Adjustments to the injection to affect the pH are made using acid solutions, including hydrochloric acid, sulfuric acid and a buffer solution of sodium hydroxide. Additional tanks, pumps and piping may be provided. Also shown pictorially in FIG. 5 are sparge injectors 67, which are used for the mixing and diffusion of the reagents into the groundwater. The use of sparge injectors to inject air or other gases into the treatment region containing the contaminated groundwater greatly enhances the effectiveness of the remediation treatment by creating regions of vertical circulation. Further effectiveness may be realized by using a groundwater recirculating system as shown in FIG. 6 which comprises piping 60, pumps 75 and pre-fracture injector 83 which is the same as that shown in FIG. 5. During the course of treatment, groundwater is pumped from the underground aquifer via pre-fracture injector(s) 83 and re-introduced under pressure into the contaminated area along with the hydrogen peroxide solution, catalyst solution and injected gases. Such recirculation and sparging agitates and circulates the aquifer, thereby dramatically increasing the efficiency of the groundwater remediation process.

The pre-fracture injectors 83 described above may also be used in the present invention as a means to contain a contaminant within a given region. That is, by placing the pre-fracture injectors outside of the contaminant plume 12a and subsequently pre-fracturing the perimeter of contaminant plume 12a with inert gases such as Nitrogen or liquids such as water, the effect of this operation is to limit the migration of contaminant plume 12a to the pre-fracture injector locations. If liquid is injected into the pre-fracture injectors and surrounding soils become saturated with the injected liquid, a liquid "fence" is placed effectively placed around the perimeter of a contaminated region.

The catalysts provide the mechanism for the formation of the hydroxyl free radical. A preferred catalyst is the soluble form of iron (ferrous sulfate); however, those skilled in the art could easily substitute other metals in place of iron or as a compliment to iron. The choice of catalyst is dependent on the characteristics of the organic substrate. Stabilizers can also be employed to delay the degradation of the hydrogen peroxide. Various tin complexes are known to stabilize the hydrogen peroxide. Such stabilizers prevent the exothermic reaction produced through the use of this method from proceeding too rapidly. Additionally, it is known in the art that emulsifying agents or detergents, which increase the exposed surface area of an organic substrate, can increase the rate of reaction and mineralization of the organic material. The specific emulsifier or detergent used is highly dependent on the nature of the organic contaminant. Surfactants and/or emulsifying agents, i.e. Ethylene Oxide Adducts, and Sulfonates (such as "MERPOL" and "ALKANOL" respectively, which are registered trademarks of E.I. DuPont De Nemours and Company) have been used and have greatly increased the rate of reaction while decreasing overall treatment time of the contaminated area.

A pilot treatment is begun by initiating flow of hydrogen peroxide solution contained in tank 65 as shown in FIG. 4 by the action of pump 71 which pumps the hydrogen peroxide solution through piping 61 to injector mixing head 45. Simultaneously, a flow of catalyst solution comprising a solution of metallic salts contained in tank 66 is initiated by the action of pump 72 which pumps the catalyst solution through piping 62 to the injector mixing head assembly 45. Among the catalysts which may be utilized are aqueous solutions salts of iron, copper, magnesium, nickel, silver, platinum and gold, all of which may be used in a catalytically effective quantity.

In the case of groundwater remediation, gas supply 64 provides pressurized gas to the injector mixing head assembly 45 and sparge injectors 67 via piping 63. Pressurized gases used may be of any type which are convenient, inexpensive, environmentally safe, and enhance the remediation process, i.e., air, ozone or nitrogen. Air may conveniently be generated on site, replacing tanks 64 with a suitable and conventional compressor assembly.

After sufficient pilot treatment, monitoring wells 24 and sentinel wells 25 are again sampled and analytically characterized for contaminants. Based upon this pilot analysis, an effective treatment radius may be finally calculated and one or more injector assemblies 30 may be added to the remediation site to completely treat the contaminant plume 12a. Upon completion of the construction of any additional injectors 30, treatment of the contaminated area may be performed.

Monitoring the progress of the reaction during the course of the pilot or actual treatment occurs through the observation of vents 81. During the course of treatment, steam may be generated underground due to the vigorous exothermic nature of the chemical reaction employed. As a result, steam and $CO_2$ may be discharged from underground, through vents 81, to the atmosphere. When the generated steam and $CO_2$ subsides, the reaction is near completion. Subsequent sampling of monitoring well 24 and sentinel well 25 and chemical characterization of samples so obtained provides further indication of the completeness and effectiveness of the treatment. Samples obtained from the monitoring wells for the purpose of determining the completion of the treatment, may be analyzed for Volatile Organic Analysis (VOA), Total Petroleum Hydrocarbons (TPH), Benzene, Toluene, Ethyl Benzene and Xylene (BTEX), Base Neutrals (BN) or other appropriate analysis known in the art.

The invention can be further understood through the following example demonstrating soil and groundwater treatment.

An industrial establishment located in the North East had a discharge of contaminants from various USTs to the soil and groundwater beneath its facility. The facility manufactured and packaged various chemical compounds for the elastomer industry. Bulk quantities of solvents and various plasticizers were stored in USTs for use during the operation of the facility. The USTs were located beneath a loading dock area which had a concrete cap over the top of the tanks. A building and parking lot surrounded the loading dock.

The business was relocated, the facility was closed and the USTs were abandoned in-place. When the facility was closed, it was discovered that approximately 2000 lb. of Di-n-butyl phthalate had leaked from an UST thereby contaminating the soil and groundwater under the loading dock and under an adjacent parking lot. The chemical compounds discharged to the subsurface environment are considered a hazardous waste in accordance with U.S. federal statutes. The contaminant caused the contamination of 500 tons of soil along with free phase and dissolved contamination in the groundwater.

The owner was required to remove the USTs and remediate the contaminated area. Traditionally, such remediative action would have involved the removal of approximately 500 tons of hazardous soil for off-site incineration, followed by the installation and operation of a groundwater pump and treat system. Before this traditional remediative action could take place, the facility owner would have had to demolish the concrete and asphalt which covered the contaminated area and shore up the adjacent structures. Such a remediative program would require approximately 2 years to complete at a cost of approximately U.S. $260,000.00 for the environmental remediation.

The present inventive oxidative injection process was used to clean both the soil and groundwater without the need to significantly disturb the site. The soil was determined by chemical analysis to contain approximately 1600 PPM of the contaminant and the groundwater was determined by chemical analysis to contain approximately 61,000 PPB of dissolved contaminants in the shallow groundwater. An undetermined amount of free floating globules of contaminant was found within the bulk groundwater. The resulting contamination plume extended to an area beneath an adjacent building, parking lot and loading dock.

Injectors as previously described were installed into the soil and groundwater and a mixture of a hydrogen peroxide solution and a solution of metallic salts (Fenton's reagents) was injected into the affected area over a period of one week.

The remediation program was designed to first oxidize the contaminants in the soil thereby preventing further contamination of the groundwater. Shallow injectors were installed within the layer of contaminated soil just above the groundwater level(approximately 10 feet or 3.05 meters). Six (6) injectors were spaced equidistant within the loading dock and parking area (approximately 100×50 feet or 30.48 m×15.24 m). A solution of hydrogen peroxide and a pH adjusted aqueous iron solution was injected under pressure. The solution created an immediate reaction with the organic compounds in the soil and the exothermic reaction liberated steam and carbon dioxide, which were monitored during the injection. The injection was complete when the theoretical quantity of reagents were injected and the reaction ceased to liberate further carbon dioxide and steam. Post-remedial soil samples were taken and analyzed for the contaminant. The results of the analysis indicated that the contamination was completely destroyed or reduced to a level below regulatory concern.

Upon successful treatment of the soil, the groundwater was treated by injecting a hydrogen peroxide solution into the groundwater. The injection was accomplished through the use of the groundwater injector assembly previously described. The volumetric quantity of groundwater was calculated to be approximately 275,000 gallons (1,039,500 liters). This represented a contaminant plume radius of approximately 100 feet (30.48 m) with a depth of approximately 75 feet (22.86 m) from the surface grade. Two (2) of the injectors were installed within the contaminated region and additional injectors were installed at the outer most bounds of the contaminant plume. The injectors located at the outer-most bounds of the plume effect treatment of the outer-most portion of the contaminated region and hydraulically contain the plume during the remediation program.

The groundwater treatment program was initiated by pretreating each of the injectors to increase the flow of reagents into the aquifer. This pretreatment both pneumatically and chemically fractured the aquifer, and thus increased the quantity of reagents that were delivered through the affected region and subsequently increased the groundwater pump rates that were utilized during the full treatment program. Following the pretreatment program, the injection program was commenced with the injection of the hydrogen peroxide and the corresponding aqueous catalyst solution while sparging air and recirculating groundwater from the outer sentinel injectors to the treatment injector.

A quantity of reagents was injected which corresponded to the theoretical volumes necessary to effectively oxidize the contaminant. The resulting reaction was monitored by measuring the change in dissolved oxygen content, electropotential, pH, and salinity of the groundwater pumped into the injector from the sentinel injector wells. Once the measured levels of these parameters increased to remedial design levels, the injection was terminated. The sentinel injectors then served as the next injection point with a previous injector being used as a sentinel pump well for a next injection series. This process was repeated until each injector and the associated contaminant region was so treated.

Upon completion of the treatment program, the aquifer was allowed to stabilize and postremedial evaluation groundwater samples were taken from the affected monitoring wells to document complete remediation of the affected region. The results of the injection program indicated that the soil and groundwater contamination was below regulatory standards only 72 hours after the final injection.

Clearly, it should now be quite evident to those skilled in the art, that while my invention was shown and described in detail in the context of a preferred embodiment, and with various modifications thereto, a wide variety of other modifications can be made without departing from scope of my inventive teachings.

I claim:

1. An injector assembly for the in-situ treatment and remediation of a contaminated underground area that contains chemical contaminants, the assembly comprising:

a cylindrical casing placed within a borehole made within the Earth and in axial alignment with said borehole such that a void exists between said casing and said borehole;

an injector mixing head having an internal central cavity and one or more ports in communication with said central cavity and one or more outlets in communication with said central cavity, said injector mixing head being attached to topmost portion of said casing at said outlet of said mixing head;

a screen assembly attached to bottommost portion of said casing such that a second void exists between said screen assembly and said bottom-most portion of said borehole;

a gravel packing placed within said borehole and contacting said screen assembly and said borehole up to and including the height of said screen assembly;

a sealing element placed within said borehole above said screen assembly which contacts said casing and said borehole thereby effectively sealing the bottommost portion of the borehole;

a grout packing placed within the borehole above said sealing element, said grout contacting said casing and said borehole for a length of said casing and said borehole above said sealing element thereby sealing the borehole above said sealing element.

2. The injector assembly of claim 1 further comprising a sparge injector having a tubular body and two ends, said sparge injector being received within said cylindrical casing such that one of said ends of said tubular body is affixed to a port of said mixing head and the other end of said tubular body is located within said screen assembly.

* * * * *